US010360805B2

(12) United States Patent
Itabashi et al.

(10) Patent No.: US 10,360,805 B2
(45) Date of Patent: Jul. 23, 2019

(54) OPERATION CONTROL APPARATUS OF MOVABLE BODY, METHOD OF CONTROLLING OPERATION OF MOVABLE BODY, AND COMPUTER READABLE MEDIUM

(71) Applicant: SUBARU CORPORATION, Tokyo (JP)

(72) Inventors: Yu Itabashi, Tokyo (JP); Akitoshi Sakaguchi, Tokyo (JP); Kentaro Hiraki, Tokyo (JP); Shinei Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 304 days.

(21) Appl. No.: 15/405,547

(22) Filed: Jan. 13, 2017

(65) Prior Publication Data

US 2019/0005829 A1    Jan. 3, 2019

(30) Foreign Application Priority Data

Mar. 23, 2016  (JP) .................................. 2016-057898

(51) Int. Cl.
*G08G 5/00* (2006.01)
*G05B 19/042* (2006.01)
(Continued)

(52) U.S. Cl.
CPC ......... *G08G 5/0069* (2013.01); *B64C 39/024* (2013.01); *G05B 19/0426* (2013.01); *G05D 1/0202* (2013.01); *G08G 5/006* (2013.01); *G08G 5/0008* (2013.01); *G08G 5/0034* (2013.01); *G08G 5/0039* (2013.01);
(Continued)

(58) Field of Classification Search
CPC .............. A01G 23/00; B64C 2201/141; B64C 39/024; G01S 17/89; G05B 19/0426; G05D 1/0094; G05D 1/0202; G06K 9/46; G08G 5/0034; G08G 5/0039; G08G 5/0069; H04N 7/18
See application file for complete search history.

(56) References Cited

U.S. PATENT DOCUMENTS

2014/0163772 A1* 6/2014 Vian .................... G05D 1/0094
701/2

FOREIGN PATENT DOCUMENTS

JP    2012-131484 A    7/2012

* cited by examiner

*Primary Examiner* — Thomas G Black
*Assistant Examiner* — Ce Li Li
(74) *Attorney, Agent, or Firm* — McDermott Will & Emery LLP

(57) ABSTRACT

Provided is an operation control apparatus of a movable body that carries out a task at a destination. The operation control apparatus includes a memory, an information acquiring unit, a cell dividing unit, a calculating unit, a determining unit, and a destination changing unit. The cell dividing unit divides map information into multiple cells that include a first cell including the destination, and a second cell. The calculating unit calculates an evaluation value related to a degree to which the task is impeded, of each of the multiple cells. The determining unit determines whether the evaluation value of the first cell is higher than a threshold. The evaluation value determined as higher, the destination changing unit changes the destination to a location in the second cell, the evaluation value of which is equal to or lower than the threshold and is minimal.

20 Claims, 6 Drawing Sheets

(51) Int. Cl.
*B64C 39/02* (2006.01)
*G05D 1/02* (2006.01)
*G08G 5/04* (2006.01)

(52) U.S. Cl.
CPC ......... *G08G 5/0078* (2013.01); *G08G 5/0091* (2013.01); *G08G 5/045* (2013.01); *B64C 2201/141* (2013.01); *B64C 2201/145* (2013.01); *G05B 19/042* (2013.01)

OPERATION CONTROL APPARATUS OF MOVABLE BODY, METHOD OF CONTROLLING OPERATION OF MOVABLE BODY, AND COMPUTER READABLE MEDIUM

CROSS-REFERENCE TO RELATED APPLICATIONS

The present application claims priority from Japanese Patent Application No. 2016-057898 filed on Mar. 23, 2016, the entire contents of which are hereby incorporated by reference.

BACKGROUND

The technology relates to a technique useful in controlling operation of a movable body such as an unmanned aircraft that carries out a task at a destination for the task while avoiding impediments to the task.

One of applications of an unmanned aircraft may be to make a long-time survey flight. In such a survey flight, the unmanned aircraft may make a fixed-point flight at a predetermined destination for a task. A long-time task may involve higher possibility of being impeded by various changes in environment such as a change in a wind state and another aircraft approaching.

For example, Japanese Unexamined Patent Application Publication (JP-A) No. 2012-131484 discloses a technique that involves acquiring information on, for example, another aircraft and a meteorological phenomenon, with a sensor mounted on an aircraft or from an air traffic control system, and calculating, on the basis of the information acquired, possibility of contention, to correct a flight path of the aircraft.

SUMMARY

The technique disclosed in JP-A No. 2012-131484 is intended for the correction of the flight path in order to avoid an impediment to the flight. Accordingly, the technique is basically not applicable to a control of the movable body that makes the fixed-point flight at the predetermined location of the task.

It is desirable to provide an operation control apparatus of a movable body, a method of controlling the operation of the movable body, and a computer readable medium having a program of controlling the operation of the movable body that make it possible to allow the movable body that carries out a predetermined task at a destination for the task to suitably avoid various impediments to the task.

An aspect of the technology provides an operation control apparatus of a movable body. The operation control apparatus includes a memory, an information acquiring unit, a cell dividing unit, a calculating unit, a determining unit, and a destination changing unit. The memory stores map information that includes at least the destination for the task. The information acquiring unit acquires surrounding information related to surrounding situation of a movable body. The cell dividing unit divides an area indicated by the map information into multiple cells. The multiple cells include a first cell and a second cell, in which the first cell includes the destination for the task. The calculating unit calculates, on a basis of the surrounding information, an evaluation value of each of the multiple cells of the map information, in which the evaluation value is related to a degree to which the task is impeded. The determining unit determines, on a basis of the evaluation value, whether or not the evaluation value of the first cell is higher than a predetermined threshold. The destination changing unit changes the destination for the task to a location in the second cell, on a condition that the determining unit determines that the evaluation value of the first cell is higher than the threshold. The evaluation value of the second cell is equal to or lower than the threshold and is minimal.

The information acquiring unit may acquire multiple pieces of the surrounding information that have different priority levels in avoidance. The calculating unit may synthesize, on a basis of the priority levels in avoidance, the multiple pieces of the surrounding information, to calculate the evaluation value as a single value for each of the multiple cells.

The information acquiring unit may acquire the surrounding information that includes information on future prediction. The calculating unit may calculate, for each of the multiple cells, the evaluation value at each time from current time to predetermined time in future. The destination changing unit may search for the second cell, and change the destination for the task to the location in the second cell. The evaluation value of the second cell is equal to or lower than the threshold and is minimal at each time from the current time to the predetermined time in the future.

The operation control apparatus of the movable body may further include a path searching unit that searches for a movement path of the movable body from a current position to the newly-changed destination for the task. The movement path may pass through one or more cells of the multiple cells. The evaluation values of the one or more cells are equal to or lower than the threshold.

The movable body may be an unmanned aircraft.

An aspect of the technology provides a method of controlling operation of a movable body that carries out a predetermined task at a destination for the task. The method includes: preparing a memory and an information acquiring unit, in which the memory stores map information that includes at least the destination for the task, and the information acquiring unit acquires surrounding information related to surrounding situation of the movable body; dividing an area indicated by the map information into multiple cells, in which the multiple cells includes a first cell and a second cell, in which the first cell includes the destination for the task; calculating, on a basis of the surrounding information, an evaluation value of each of the multiple cells of the map information, in which the evaluation value is related to a degree to which the task is impeded; determining, on a basis of the evaluation value, whether or not the evaluation value of the first cell is higher than a predetermined threshold; and changing the destination for the task to a location in the second cell, on a condition that the evaluation value of the first cell is determined as higher than the threshold. The evaluation value of the second cell is equal to or lower than the threshold and is minimal.

An aspect of the technology provides a non-transitory computer readable medium having a program of controlling operation of a movable body that carries out a predetermined task at a destination for the task. The program causes, when executed by an operation control apparatus that includes a memory that stores map information that includes at least the destination for the task and an information acquiring unit that acquires surrounding information related to surrounding situation of the movable body, the operation control apparatus to: divide an area indicated by the map information into multiple cells, in which the multiple cells includes a first cell and a second cell, in which the first cell includes the destination for the task; calculate, on a basis of the surrounding information, an evaluation value of each of the multiple cells of the map information, in which the evaluation value is related to a degree to which the task is impeded; determine, on a basis of the evaluation value, whether or not the evaluation value of the first cell is higher than a predetermined threshold; and change the destination for the task to a location in the second cell, on a condition that the evaluation value of the first cell is determined as higher than the threshold, in which the evaluation value of the second cell is equal to or lower than the threshold and is minimal.

An aspect of the technology provides an operation control apparatus of a movable body that carries out a predetermined task at a destination for the task. The operation control apparatus includes, a sensor and a communicator, or both, and circuitry. The memory stores map information that includes at least the destination for the task. The sensor or the communicator, or the both acquire surrounding information related to surrounding situation of the movable body. The circuitry divides the map information into multiple of cells. The multiple cells include a first cell and a second cell, in which the first cell includes the destination for the task. The circuitry is configured to calculate, on a basis of the surrounding information, an evaluation value of each of the multiple of cells of the map information, in which the evaluation value is related to a degree to which the task is impeded. The circuitry is configured to determine, on a basis of the evaluation value, whether or not the evaluation value of the first cell is higher than a predetermined threshold. The circuitry is configured to change the destination for the task to a location in the second cell, on a condition that the evaluation value of the first cell is determined as higher than the threshold. The evaluation value of the second cell is equal to or lower than the threshold and is minimal.

DETAILED DESCRIPTION

In the following, some implementations of the technology are described with reference to the drawings. The following description of the implementations is given on a case in which the operation control apparatus of the movable body according to one implementation of the technology is applied to a flight control apparatus 10 that performs a flight control of an unmanned aircraft 1.
[Configuration of Flight Control Apparatus]

First, a configuration of the flight control apparatus 10 according to this implementation is described with reference to FIG. 1.

Figure 1:
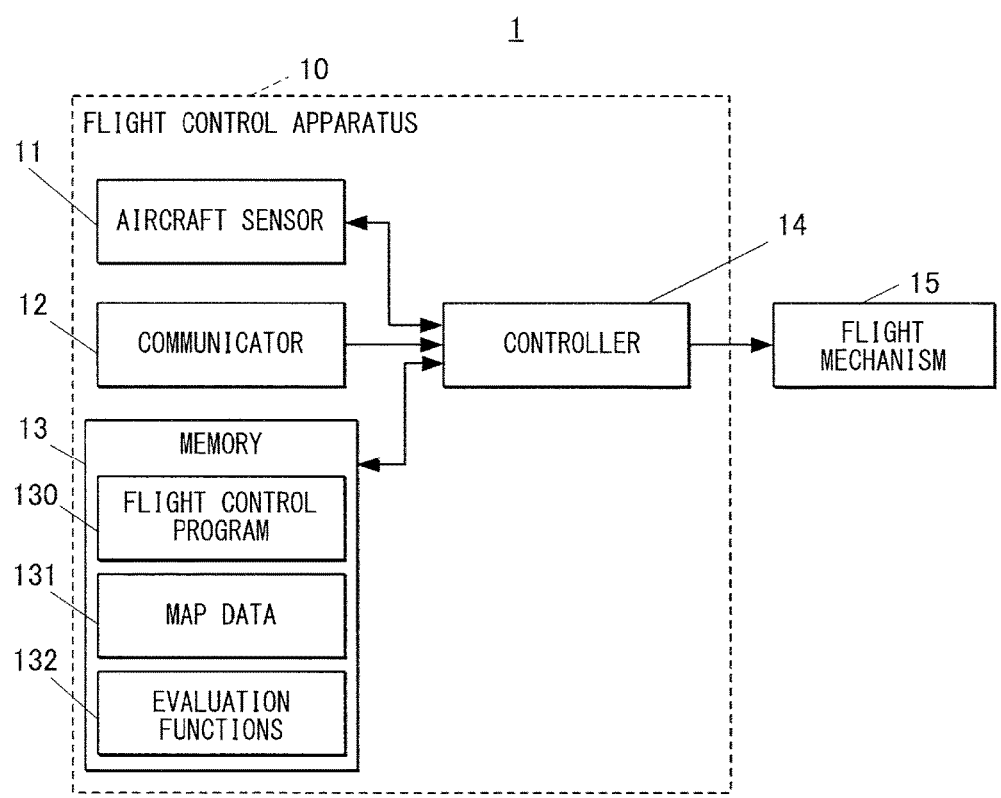
FIG. 1 is a block diagram illustrating an outline configuration of an unmanned aircraft according to one implementation of the technology.

FIG. 1 is a block diagram illustrating an outline configuration of the unmanned aircraft 1 on which the flight control apparatus 10 may be mounted. In one alternative, the flight control apparatus 10 may be mounted on any other movable body.

The flight control apparatus 10 may perform the flight control of the unmanned aircraft 1, and be mounted on the unmanned aircraft 1 in this implementation. The unmanned aircraft 1 carries out a task at a destination for the task. In this implementation, the task may be to survey a predetermined survey target for a long time while staying in the air at the destination for the task.

In one specific but non-limiting example, referring to FIG. 1, the flight control apparatus 10 may include an aircraft sensor 11, a communicator 12, a memory 13, and a controller 14.

The aircraft sensor 11 may include various sensors such as a sensor that detects a flight state of the unmanned aircraft 1 and a sensor that acquires information on surrounding situation of the unmanned aircraft 1. The information on the surrounding situation of the unmanned aircraft 1 may be hereinafter referred to as "surrounding information". Non-limiting examples of the various sensors may include radar, an image sensor (a camera), a gyroscope sensor, a velocity sensor, a global positioning system (GPS), and a traffic alert and collision avoidance system (TCAS). The aircraft sensor 11 may acquire various pieces of information on the basis of control instructions given by the controller 14, and supply a signal representing the acquired pieces of information to the controller 14.

The communicator 12 may communicate with a control facility on the ground. As used herein, the term "on the ground" is to be construed as including "at the sea" and "in the air". The communicator 12 may communicate with another aircraft, etc. The communicator 12 may transmit various signals to and receive various signals from the foregoing control facility, another aircraft, etc. Furthermore, the communicator 12 may be accessible to various pieces of information through connection to a communication network.

The communicator 12 may also transmit and receive an automatic dependent surveillance-broadcast (ADS-B) signal that includes various pieces of information such as an identifier, a current position, an altitude, and an airspeed.

The memory 13 may store a program, data, etc., that are used to achieve various functions of the unmanned aircraft 1. The memory 13 may also serve as a workspace. In this implementation, the memory 13 may store a flight control program 130.

The flight control program 130 may cause the controller 14 to execute a flight control process which is described later with reference to FIG. 2.

The memory 13 may store map data 131 and evaluation functions 132, as pieces of information that are involved in executing the flight control process described later.

The map data 131 may be three-dimensional data that includes comprehensive geographic information including terrain information and information on a utilization state of the land. Non-limiting examples of the terrain information may include information on a mountain and a river. Non-limiting examples of the information on the utilization state of the land may include information on a road, a railway, and a building. The memory 13 may store the map data 131 of a predetermined range including at least the destination for the task of the unmanned aircraft 1.

The evaluation functions 132 may be provided for calculation of an evaluation value related to a degree to which the task is impeded, as described later. In this implementation, the memory 13 may store the evaluation functions 132 that are related to respective three impediments to the task, namely, a wind state, another aircraft, and a restricted airspace.

The controller 14 may perform a central control of each unit included in the unmanned aircraft 1. In one specific but non-limiting example, the controller 14 may perform a drive control of a flight mechanism 15 including components such as an engine and a control surface actuator, and thereby control the flight of the unmanned aircraft 1. The controller 14 may load the program stored in the memory 13, and thereby execute various processes on the basis of the loaded program.

[Operation of Flight Control Apparatus]

Description is given below of operation of the flight control apparatus 10 performed upon execution of the flight control process, with reference to FIGS. 2 to 6.

Figure 2:
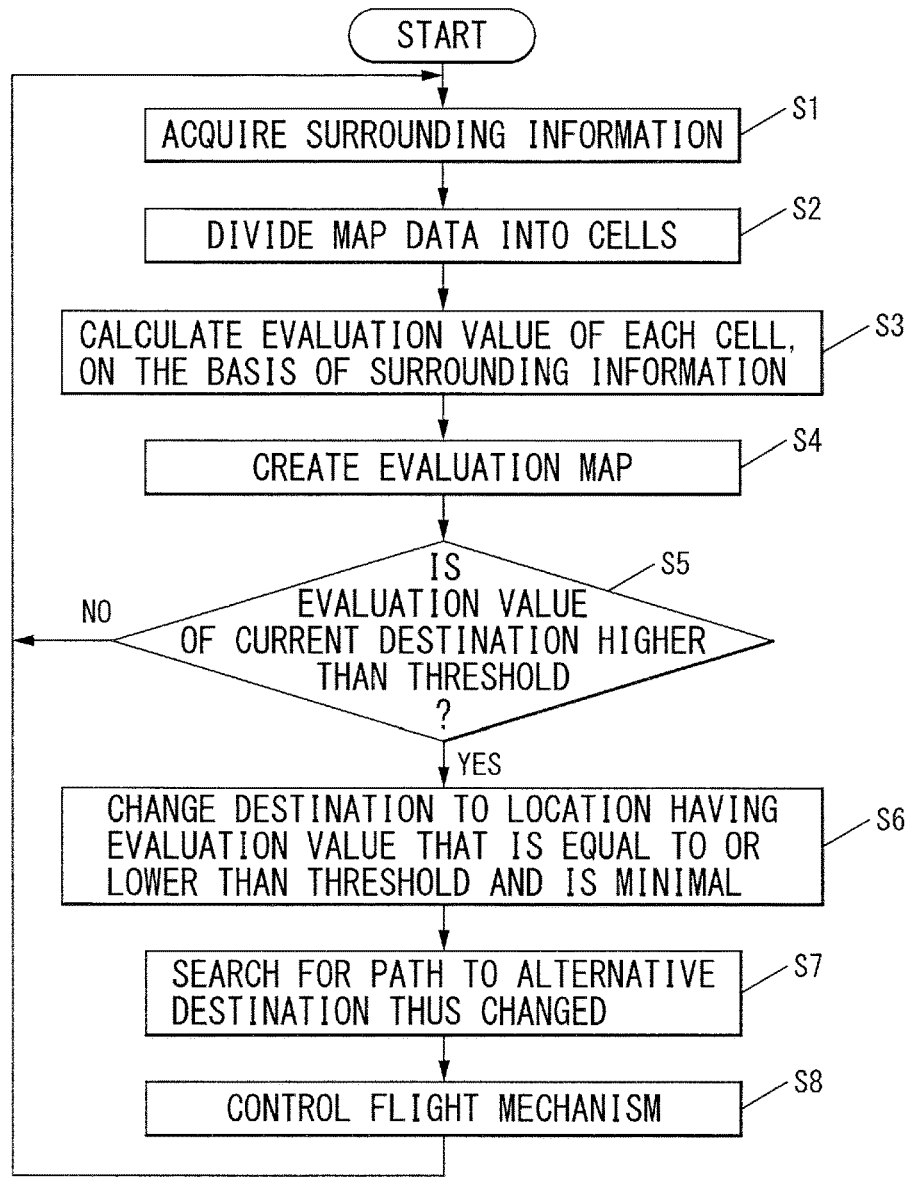
FIG. 2 is a flowchart illustrating an example of a flow of a flight control process.
Figure 3A:
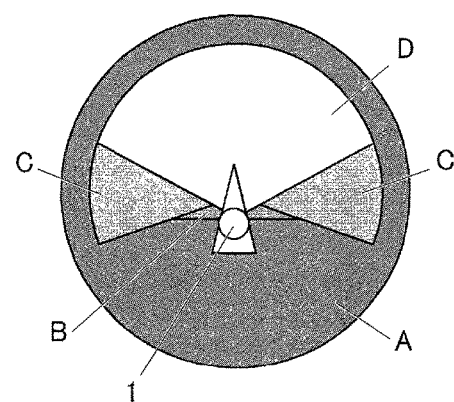
FIGS. 3A, 3B, and 3C each describe the flight control process.
Figure 3B:
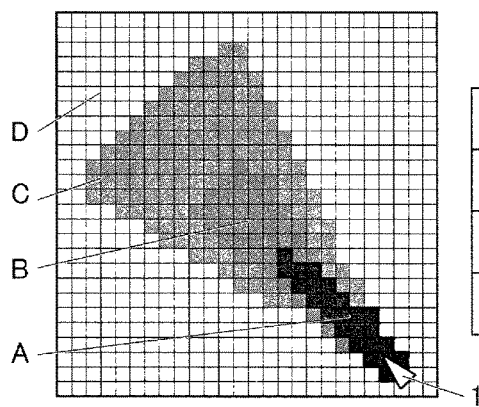
Figure 3C:
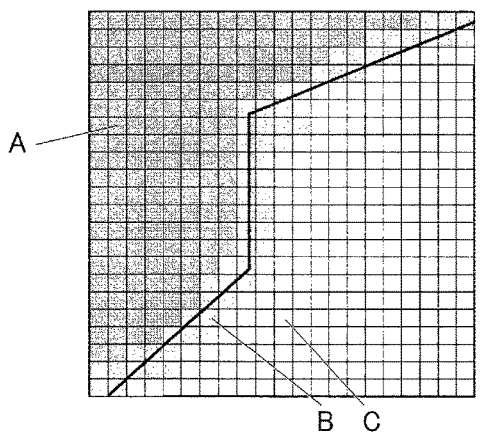

FIG. 2 is a flowchart illustrating an example of a flow of the flight control process. FIGS. 3A to 3C, and FIGS. 4 to 6 are diagrams provided for description of the flight control process.

The flight control process may involve evaluating the degree to which the task is impeded at the destination for the task, and taking an action as necessary, for example, changing the destination for the task. In this implementation, the flight control process may be executed at any time during the flight. The controller 14 may read and load the flight control program 130 stored in the memory 13, and thereby execute the flight control process, upon reception of instructions to execute the flight control process through reception of a control order, etc. from a facility on the ground.

In what follows, it is assumed that the unmanned aircraft 1 is surveying the survey target while staying in the air in a predetermined flight pattern, at the destination for the task at current time. In this implementation, the predetermined flight pattern may be, for example, of a shape of a figure of 8.

Referring to FIG. 2, upon the execution of the flight control process, the controller 14 may first acquire the surrounding information of an own aircraft (the unmanned aircraft 1) (step S1).

In step S1, the controller 14 may acquire the surrounding information related to the impediments to the task that are likely to impede the task. The controller 14 may acquire, with the aircraft sensor 11 and the communicator 12, information such as position information of the own aircraft and position information of another aircraft. The controller 14 may also acquire, with the communicator 12, information such as weather information and meteorological information. The controller 14 may store the acquired information in the memory 13.

In this implementation, the controller 14 may acquire wind-state information on the basis of numerical meteorological information and significant meteorological information (SIGMET) supplied from, for example, a meteorological observatory. The wind-state information may include, for example, a wind speed and a wind direction. The controller 14 may acquire information on another aircraft on the basis of the ADS-B signal. The controller 14 may acquire information on the restricted airspace on the basis of, for example, NOTAM, i.e., various pieces of aviation-related information supplied from, for example, a public agency for aviation. Out of the above-listed information to be acquired, the wind-state information and the information on another aircraft may each include information on future prediction at predetermined time intervals and until predetermined time later.

The following is reasons that make the three impediments to the task, i.e., the wind state, another aircraft, and the restricted airspace, deserve consideration of avoidance.

The wind state may have possibility of hindering the unmanned aircraft 1 from maintaining its flight position when the unmanned aircraft 1 tries to maintain an attitude that allows for continuation of the survey task, or an attitude that allows for coverage of the survey target within a viewing angle of the image sensor.

Another aircraft may have possibility of hindering the unmanned aircraft 1 from maintaining the attitude that allows for the continuation of the survey task when the unmanned aircraft 1 takes a collision avoidance maneuver.

The restricted airspace may have possibility of forcing the unmanned aircraft 1 into a change of attitude in order to avoid a collision with an obstacle, or possibility of causing limitation of a visual field due to an obstacle, if the unmanned aircraft 1 should enter the restricted airspace.

Thereafter, the controller 14 may read the three-dimensional map data 131 from the memory 13, and divide the map data 131 into multiple lattice-shaped cells (step S2). The multiple cells may be shaped of, for example, cubic lattices, sides of which extend along longitudinal lines, latitudinal lines, and vertical lines.

Thereafter, the controller 14 may calculate, on the basis of the surrounding information acquired in step S1, an evaluation value regarding the degree to which the task is impeded, for each of the multiple cells on the map data 131 (step S3).

Here, the "evaluation value regarding the degree to which the task is impeded" may indicate likelihood that the survey task is impeded. The larger the evaluation value, the more likely it is that the task is impeded.

This implementation may involve calculating the evaluation value for each of the three impediments to the task, i.e., the wind state, another aircraft, and the restricted airspace, at each time from the current time to predetermined time in the future. The evaluation value may be calculated with use of the evaluation functions 132 stored in the memory 13.

Moreover, the three impediments may have respective priority levels in avoidance. A non-limiting example of setting of the priority levels may be as follows. The restricted airspace may have priority over the wind state, and the wind state may have priority over another aircraft. On the basis of the priority levels in avoidance, the evaluation values that are comparable to one another may be assigned to the respective impediments. However, in some cases, the priority level in avoidance of the restricted airspace may be lowered, depending on a reason for setting of the restricted airspace.

Setting of the evaluation value related to the wind state may be provided on the basis of a method of adjusting the flight pattern adopted by the unmanned aircraft 1 in order to maintain the flight position of the unmanned aircraft 1, under the relevant wind state, i.e., the wind speed and the wind direction. Non-limiting examples of the method of adjusting the flight pattern may include adjustment of a radius of a circular flight, an angle of intersection, and/or an angle of inclination. In one specific but non-limiting example, as illustrated in, for example, FIG. 3A, the setting of the evaluation values may be provided that correspond to areas around the unmanned aircraft 1.

Setting of the evaluation value related to another aircraft may be provided so as to allow the evaluation value to be a smaller value as the unmanned aircraft 1 is spaced apart from another aircraft. In one specific but non-limiting example, as illustrated in, for example, FIG. 3B, the setting of the evaluation values may be provided that correspond to detection ranges of TCAS and the ADS-B signal.

Setting of the evaluation value related to the restricted airspace may be provided so as to allow the evaluation value to be a smaller value as the unmanned aircraft 1 is spaced apart from a border of the restricted airspace. Outside the restricted airspace, the evaluation value may be set to any predetermined value. In one specific but non-limiting example, as illustrated in, for example, FIG. 3C, setting of the evaluation values related to an air defense identification zone (ADIZ) may be provided as follows. In a zone near a border of the ADIZ, the evaluation value may be set to a value that corresponds to a distance from the border. In an area spaced apart from the border to a certain degree, the evaluation value may be set to a constant value.

Thereafter, the controller 14 may create an evaluation map M (refer to FIG. 4) (step S4). The evaluation map M may represent, on the map data 131, the evaluation values calculated in step S3.

In one specific but non-limiting example, the controller 14 may add up the evaluation values related to the respective three impediments for each of the multiple cells, assign the addition to the relevant cell, and thereby create the evaluation map M. The controller 14 may perform this work with respect to the evaluation value at each time, and thereby create the evaluation map M at each time from the current time to the predetermined time in the future.

Note that as described, the evaluation values related to the three impediments may be comparable to one another, on the basis of the prescribed priority levels in avoidance. Accordingly, the simple addition of the evaluation values makes it possible to obtain the evaluation value appropriately synthesized on the basis of the priority levels in avoidance. However, the addition of the evaluation values may involve weighting as appropriate.

Figure 4:
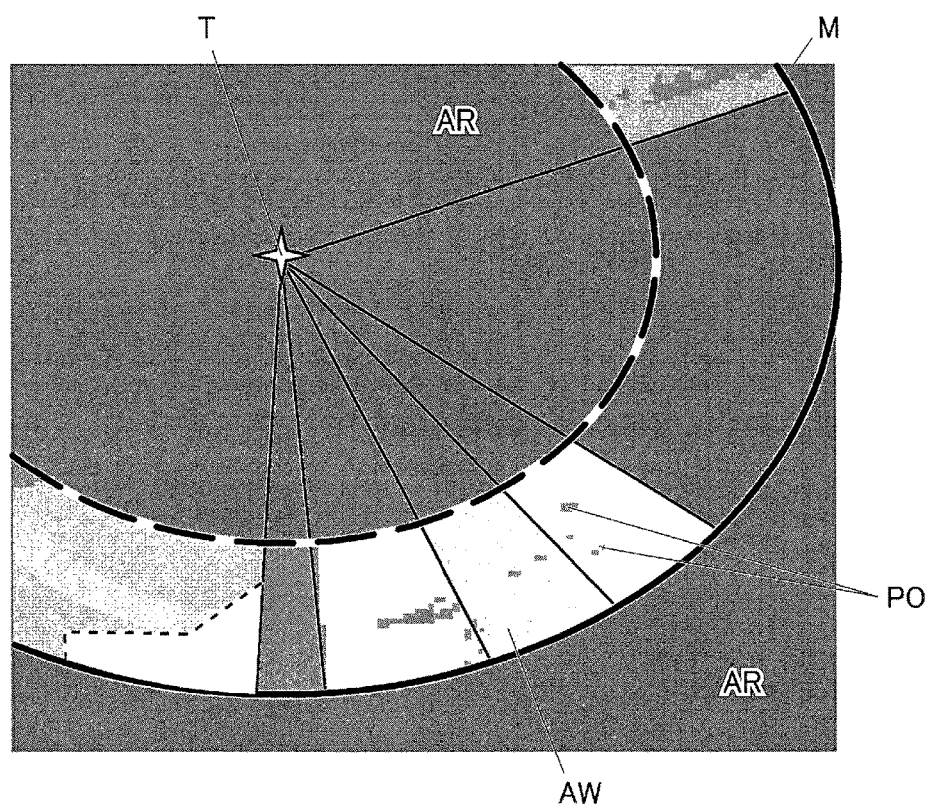
FIG. 4 describes the flight control process.

In step S4, the evaluation map M as illustrated in, for example, FIG. 4 may be created. In the figure, the thicker a color is, the larger the evaluation value is. In other words, the closer to black the color is, the larger the evaluation value is. Thus, the evaluation value is represented by gradation of the color (gray scale).

As illustrated in the figure, it is understood that in the evaluation map M, the evaluation values may reflect an airspace AW affected by the wind state, a restricted airspace AR, and presence of another aircraft PO. The restricted airspace AR may be both a region inside double elliptical lines around the survey target T in the figure, and a region outside the double elliptical lines.

Thereafter, as illustrated in FIG. 2, the controller 14 may determine, on the basis of the evaluation map M created in step S4, whether or not the evaluation value of a cell that includes the current destination for the task is higher than a predetermined threshold (step S5). In other words, in step S5, the determination may be made on whether or not the continuation of the survey task at the current destination for the task is difficult. Hereinafter, the cell that includes the current destination for the task is referred to as a "destination cell". In one implementation of the technology, the cell that includes the destination for the task, or the destination cell, may serve as a "first cell".

A threshold may be set for each of the three impediments to the task. A threshold regarding the wind state may be a value that corresponds to the wind speed and the wind direction that make it difficult to maintain the flight position by the adjustment of the flight pattern. A threshold regarding another aircraft may be a value that corresponds to a border between detectability and non-detectability with the ADS-B signal. A threshold regarding the restricted airspace may be set at any value.

The threshold that is compared to the evaluation value of the destination cell may be a sum of the thresholds regarding the three impediments, with the thresholds weighted as appropriate.

Note that in the following description, simple representation of "the threshold" refers to the sum of the thresholds regarding the three impediments, unless otherwise specified.

In step S5, when the controller 14 determines that the evaluation value of the destination cell is lower than the threshold (NO in step S5), the controller 14 may make a transition of the process to step S1 described above. In other words, in this case, it is determined that the current destination for the task has sufficient continuity for the task. Accordingly, the survey task may be continued at the relevant destination for the task.

In step S5, when the controller 14 determines that the evaluation value of the destination cell is higher than the threshold (YES in step S5), the controller 14 may change the destination for the task to a location in a cell having the evaluation value that is equal to or lower than the threshold and is minimal (step S6). In one implementation of the technology, the cell having the evaluation value that is equal to or lower than the threshold may serve as a "second cell".

Figure 5:
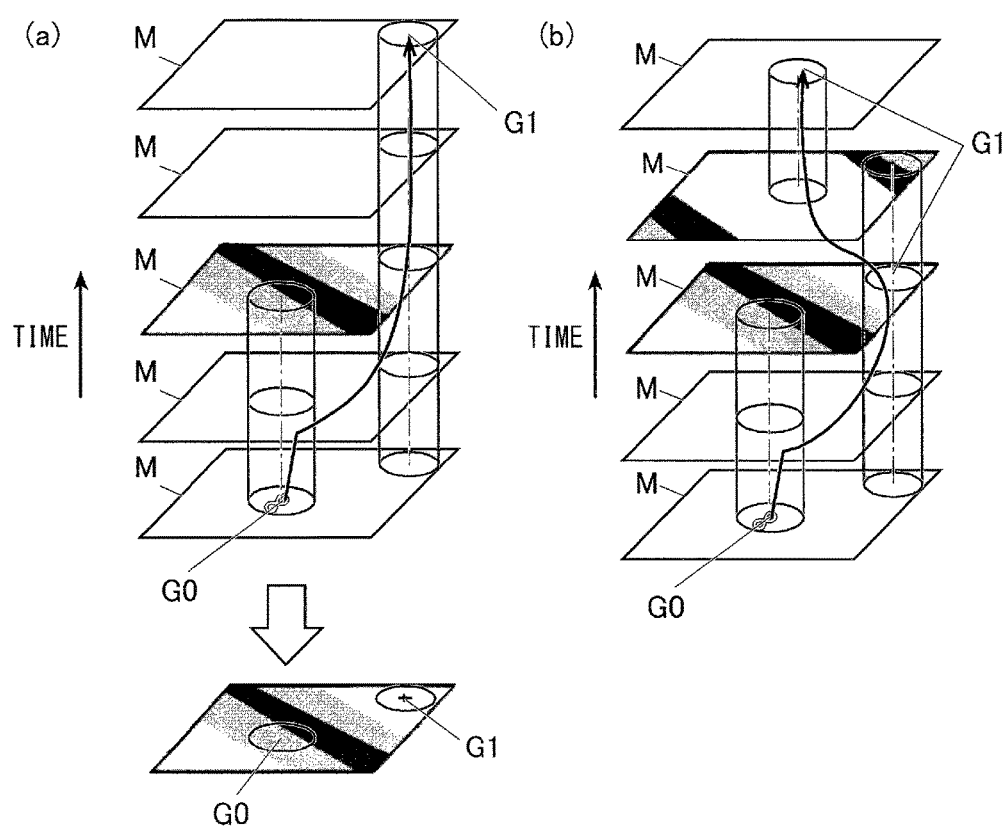
FIG. 5 describes the flight control process.

In one specific but non-limiting example, as illustrated in (a) of FIG. 5, the controller 14 may search for an optimal cell, from cells in a predetermined range, on the basis of multiple evaluation maps M of entire prediction time. The predetermined range may be a range that is involved in carrying out the task, and includes, as a center, the current destination G0 for the task. The prediction time may be a period of time from the current time to the predetermined time in the future, for which the information on the future prediction of the wind state and another aircraft may be obtained. The optimal cell may have the evaluation value that is equal to or lower than the threshold and is minimal, over the entire prediction time. In other words, the optimal cell may be a cell that is considered to have the highest continuity of the task. The controller 14 may set a location in the optimal cell as an alternative destination G1, i.e., a new destination for the task.

When the controller 14 fails in finding one cell that serves as the optimal cell over the entire prediction time, the controller 14 may divide a time range for the search, and search for optimal cells that vary with time, as illustrated in (b) of FIG. 5. The optimal cells each may have, as long as possible, the evaluation value that is equal to or lower than the threshold and is minimal. The controller 14 may set locations in the relevant optimal cells as the alternative destinations G1.

Figure 6:
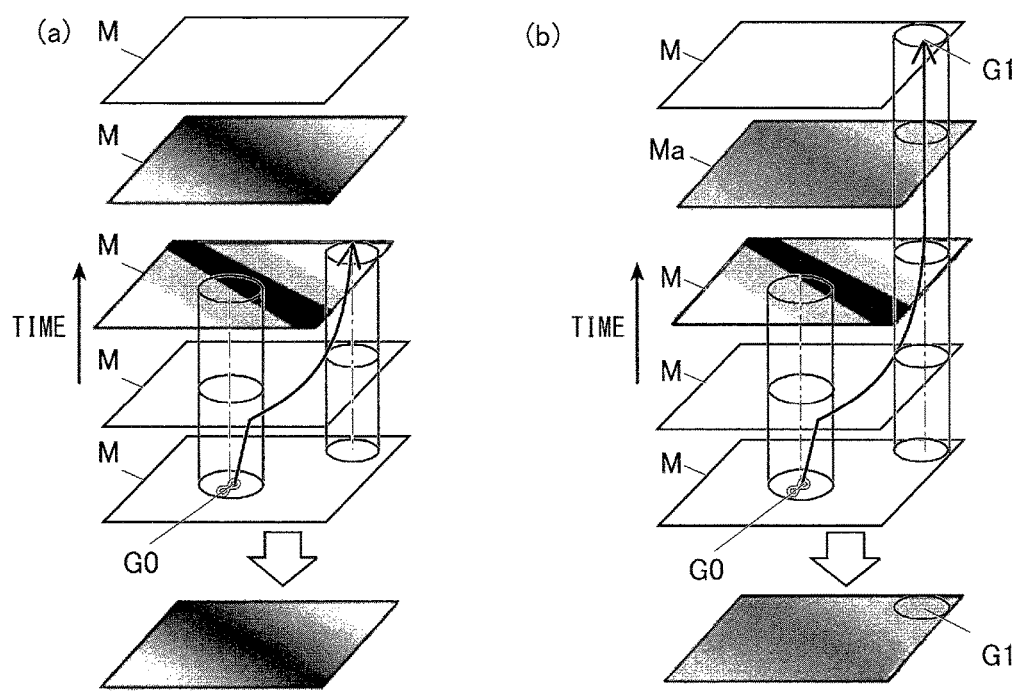
FIG. 6 describes the flight control process.

Referring to (a) of FIG. 6, there may be a case in which the controller 14 may fail in finding a cell that serves as the optimal cell, even if the controller 14 divides the time range for the search, because there is a time zone (the evaluation map M) with widely distributed cells having the evaluation values higher than the threshold.

In such a case, as illustrated in (b) of FIG. 6, the controller 14 may make stepwise correction of the threshold at the relevant time, on the basis of the priority levels in avoidance, and thereby correct the evaluation map M at the relevant time to create a corrected evaluation map Ma. The controller 14 may search for a cell that serves as the optimal cell, with use of the corrected evaluation map Ma, and thereby pursue possibility of the continuation of the task. In this case, the priority levels in avoidance and/or the threshold may be adjusted on the basis of a decision of an operator (a human being).

Thereafter, as illustrated in FIG. 2, the controller 14 may search for a flight path from the current position (or the current destination for the task) to the alternative destination G1 set in step S6, on the basis of the multiple evaluation maps M over the entire prediction time (step S7).

In one specific but non-limiting example, the controller 14 may search for the flight path that passes through one or more cells having the evaluation values that are equal to or lower than the threshold, over the entire region on the flight path. In one preferable but non-limiting example, the one or more cells may have the evaluation values that are equal to or lower than the threshold and are minimal, over the entire region on the flight path. However, when the controller 14 fails in searching for the suitable flight path, the controller 14 may return to step S6, and re-set the alternative destination G1.

After searching for and setting the flight path to the alternative destination G1, the controller 14 may control the flight mechanism 15, so as to make a flight along the flight path (step S8). Thereafter, the controller 14 may make the transition of the process to step S1 described above.

As described, steps S1 to S8 may be executed at any time, and thereby, the destination for the task (the alternative destination) and the flight path thereto may be updated at any time, on the basis of the latest surrounding information. This allows for accomplishment of the task at the destination for the task, in which the destination has high continuity of the task.

The controller 14 may end the flight control process, upon receipt of an ending instruction inputted by an operator, or a lapse of predetermined time for the task.

[Effects]

As described, in this implementation, the surrounding information related to the surrounding situation of the unmanned aircraft 1 may be acquired. On the basis of the surrounding information, the evaluation value of each of the multiple cells on the map data 131 may be calculated. The evaluation value may be related to the degree to which the task is impeded. When the evaluation value of the cell that includes the current destination G0 for the task of the unmanned aircraft 1 is higher than the predetermined threshold, the destination G0 for the task may be changed to the alternative destination G1 for the task in the cell having the evaluation value that is equal to or lower than the threshold and is minimal.

In this way, the information related to the various impediments to the task may be acquired as the surrounding information. The evaluation value based on the surrounding information allows for evaluation of the degree to which the task is impeded, of the destination G0 for the task. When the destination G0 for the task has the high degree to which the task is impeded, setting of the alternative destination G1 may be provided that has a higher level of safety (is unlikely to be impeded).

Hence, it is possible to allow a movable body that carries out a predetermined task at a destination for the task to suitably avoid various impediments to the task.

Moreover, the multiple pieces of the surrounding information may be synthesized, on the basis of their respective priority levels in avoidance, to calculate the evaluation value as a single value for each of the multiple cells. Setting the priority levels in avoidance regarding the various impediments to the task makes it possible to allow the priority levels in avoidance regarding the respective impediments to the task to be suitably reflected in the change of the destination for the task.

Furthermore, the evaluation value at each time from the current time to the predetermined time in the future may be calculated. The destination for the task may be changed to the location in the cell, the evaluation value of which is equal to or lower than the threshold and is minimal at each time from the current time to the predetermined time in the future. Hence, it is possible to maximize the continuity of the task.

In addition, the flight path from the current position to the alternative destination G1 may be searched for. The flight path may pass through one or more cells of the multiple cells. The evaluation values of the one or more cells are equal to or lower than the threshold. Hence, it is possible to suitably avoid the various impediments to the task, on the flight path to the alternative destination as well.

[Modifications]

It is to be noted that the technology is not limitedly applicable to the foregoing implementations. It should be appreciated that modifications and alterations may be made by persons skilled in the art without departing from the scope as defined by the appended claims.

For example, in the forgoing implementation, the description has been given referring to the example in which the operation control apparatus of the movable body according to one implementation of the technology is applied to the flight control apparatus 10 of the unmanned aircraft 1. However, the technology is also applicable to an operation control apparatus of various movable bodies besides the unmanned aircraft, as long as the movable bodies carry out the predetermined task at the destination for the task. Non-limiting examples may include a manned aircraft and a vessel.

Moreover, in the forgoing implementation, the description has been given referring to the example in which the unmanned aircraft 1 carries out the task of surveying the predetermined survey target for a long time while staying in the air at the destination for the task. However, the operation control apparatus of the movable body according to one implementation of the technology may be applicable not only to the case of the stay in the air, i.e., the long-time flight, but also to a case of a short-time flight. The operation control apparatus of the movable body according to one implementation of the technology may be applicable to various tasks such as an attempt to remove an obstacle, and communication relay.

Further, the description has been given referring to the example in which the flight control apparatus 10 is mounted on the unmanned aircraft 1. However, the operation control apparatus of the movable body according to one implementation of the technology may be provided in a facility on the ground. Further, the operation control apparatus according to one implementation of the technology mounted on an aircraft and the operation control apparatus according to one implementation of the technology provided in a facility on the ground may perform a control in association with each other.

In one implementation described above, the controller 14 may include a semiconductor integrated circuit that may have devices such as, but not limited to, a central processing unit (CPU), ROM, and RAM. In an alternative implementation, the controller 14 may include an integrated circuit such as, but not limited to, a field programmable gate array (FPGA) and an application specific integrated circuit (ASIC). The controller 14 or any other controller may include one or more central processing units, one or more FPGAs, and/or one or more ASICs.

The implementation also provides a program as the flight control program 130 that causes a computer to function as the controller 14, and a recording medium that stores the program. The recording medium is computer readable. Non-limiting examples of the recording medium may include a flexible disk, a magneto-optical disk, ROM, CD, DVD (Registered Trademark) and BD (Registered Trademark). As used herein, the term "program" may refer to a data processor written in any language and any description method.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An operation control apparatus of a movable body, the operation control apparatus comprising:
   a memory that stores map information that comprises a destination at which the movable body carries out a task;
   an information acquiring unit that acquires surrounding information related to surrounding situation of the movable body;
   a cell dividing unit that divides an area indicated by the map information into multiple cells including a first cell and a second cell, the first cell including the destination at which the movable body carries out the task;
   a calculating unit that calculates, based on the surrounding information, potential values of the task being impeded at a predetermined time in each of the multiple cells of the map information, wherein the calculating unit calculates as the potential values at least:
      a first potential value and a second potential value at a current time in the first cell and the second cell, respectively; and
      a third potential value and a fourth potential value at a future time in the first cell and the second cell, respectively, the future time being a predetermined period of time after the current time;
   a determining unit that determines that both the first potential value at the current time and the third potential value at the future time in the first cell are higher than a threshold;
   a destination changing unit that changes, in response to determining that both the first potential value at the current time and the third potential value at the first time in the first cell are higher than the threshold, the destination from a location in the first cell to a location in the second cell, wherein both the second potential value at the current time and the fourth potential value at the future time in the second cell are equal to or lower than the threshold;
   a path searching unit that searches for a movement path of the movable body from the location in the first cell to the location in the second cell to which the destination is changed; and
   a flight mechanism that allows the movable body to move along the movement path.

2. The operation control apparatus of the movable body according to claim 1, wherein
the information acquiring unit acquires multiple pieces of the surrounding information that have different priority levels in avoidance, and
the calculating unit synthesizes, based on the different priority levels in avoidance, the multiple pieces of the surrounding information to calculate the potential value as a single value for each of the first cell and the second cell.

3. The operation control apparatus of the movable body according to claim 2,
wherein the information acquiring unit acquires the surrounding information that includes information on future prediction.

4. The operation control apparatus of the movable body according to claim 3, the movement path passing through one or more cells of the multiple cells having potential values equal to or lower than the threshold.

5. The operation control apparatus of the movable body according to claim 3, wherein the movable body is an unmanned aircraft.

6. The operation control apparatus of the movable body according to claim 2, the movement path passing through one or more cells of the multiple cells having potential values equal to or lower than the threshold.

7. The operation control apparatus of the movable body according to claim 2, wherein the movable body is an unmanned aircraft.

8. The operation control apparatus of the movable body according to claim 1, wherein
the information acquiring unit acquires the surrounding information that includes information on future prediction.

9. The operation control apparatus of the movable body according to claim 8, the movement path passing through one or more cells of the multiple cells having potential values equal to or lower than the threshold.

10. The operation control apparatus of the movable body according to claim 8, wherein the movable body is an unmanned aircraft.

11. The operation control apparatus of the movable body according to claim 1, the movement path passing through one or more cells of the multiple cells having potential values equal to or lower than the threshold.

12. The operation control apparatus of the movable body according to claim 1, wherein the movable body is an unmanned aircraft.

13. The operation control apparatus of the movable body according to claim 1,
wherein the cell dividing unit divides the area into the multiple cells having shapes of cubic lattices.

14. The operation control apparatus of the movable body according to claim 1,
wherein the information acquiring unit acquires, from one or more sensors or communicators equipped on the movable body, a first information related to a wind state in surroundings of the movable body and a second information related to another movable body in the surroundings,
wherein the cell dividing unit divides the area into the multiple cells having shapes of cubic lattices, and
wherein the calculating unit calculates the potential values based on the first information and the second information.

15. A method of controlling operation of a movable body that carries out a task at a destination, the method comprising:

storing map information that comprises a destination at which the movable body carries out the task; acquiring surrounding information related to surrounding situation of the movable body;

dividing an area indicated by the map information into multiple cells, the multiple cells including a first cell and a second cell, the first cell including the destination at which the movable body carries out the task;

calculating, based on the surrounding information, a potential value of the task being impeded at a predetermined time in each of the multiple cells of the map information, wherein a first potential value and a second potential value at a current time in the first cell and the second cell are respectively calculated based on the surrounding information, wherein a third potential value and a fourth potential value at a future time in the first cell and the second cell are respectively calculated based on the surrounding information;

determining that both the first potential value at the current time and the third potential value at the future time in the first cell are higher than a threshold, the future time being a predetermined period of time after the current time;

changing the destination from a location in the first cell to a location in the second cell based on determining that both the first potential value at the current time and the third potential value at the future time in the first cell are higher than the threshold and that the second potential value at the current time and the fourth potential value at the future time in the second cell are equal to or lower than the threshold;

searching for a movement path of the movable body from the location in the first cell to the location in the second cell to which the destination is changed; and allowing the movable body to move along the movement path.

16. The method of controlling operation of a movable body according to claim 15, further comprising:

acquiring, from the acquiring surrounding information, a first information related to a wind state in surroundings of the movable body and a second information related to another movable body in the surroundings;

dividing, in the dividing the area into the multiple cells, the area into the multiple cells having shapes of cubic lattices; and calculating, in the calculating the potential value, the potential values based on the first information and the second information.

17. A non-transitory computer readable medium having a program for controlling operation of a movable body that carries out a task at a destination, the program causing, when executed by an operation control apparatus that includes a memory that stores map information that comprises the destination at which the movable body carries out the task and an information acquiring unit that acquires surrounding information related to surrounding situation of the movable body, the operation control apparatus to:

divide an area indicated by the map information into multiple cells, the multiple cells including a first cell and a second cell, and the first cell including the destination at which the movable body carries out the task;

calculate, based on the surrounding information, a potential value of the task being impeded at a predetermined time in each of the multiple cells of the map information, wherein a first potential value and a second potential value at a current time in the first cell and the second cell are respectively calculated based on the surrounding information, wherein a third potential value and a fourth potential value at a future time in the first cell and the second cell are respectively calculated based on the surrounding information;

determine that both the first potential value at the current time and the third potential value at the future time in the first cell are higher than a threshold, the future time being a predetermined period of time after the current time; and change from a location in the first cell to a location in the second cell based on determining that both the first potential value at the current time and the third potential value at the future time in the first cell are higher than the threshold and that the second potential value at the current time and the fourth potential value at the future time in the second cell are equal to or lower than the threshold;

search for a movement path of the movable body from the location in the first cell to the location in the second cell to which the destination is changed; and allow the movable body to move along the movement path.

18. The non-transitory computer readable medium according to claim 17, wherein the program causes the operation control apparatus to:

divide the area into the multiple cells having shapes of cubic lattices;

acquire, from one or more sensors or communicators equipped on the movable body, a first information related to a wind state in surroundings of the movable body and a second information related to another movable body in the surroundings; and calculate the potential values based on the first information and the second information.

19. An operation control apparatus of a movable body that carries out a task at a destination, the operation control apparatus comprising:

a memory that stores map information that comprises the destination at which the movable body carries out the task;

a sensor or a communicator, or both that acquire surrounding information related to surrounding situation of the movable body that carries out the task at the destination; and circuitry configured to divide an area indicated by the map information into multiple cells, the multiple cells including a first cell and a second cell, and the first cell including the destination at which the movable body carries out the task;

calculate, based on the surrounding information, potential values of the task being impeded at a predetermined time in each of the multiple cells of the map information, wherein a first potential value and a second potential value at a current time in the first cell and the second cell are respectively calculated based on the surrounding information, wherein a third potential value and a fourth potential value at a future time in the first cell and the second cell are respectively calculated based on the surrounding information;

determine that both the first potential value at the current time and the third potential value at the future time in the first cell are higher than a threshold, the future time being a predetermined period of time after the current time;

change from a location in the first cell to a location in the second cell based on determining that both the first potential value at the current time and the third potential value at the future time in the first cell are higher than the threshold and that the second potential value at the current time and the fourth potential value at the future time in the second cell are equal to or lower than the threshold;

search for a movement path of the movable body from the location in the first cell to the location in the second cell to which the destination is changed; and allow the movable body to move along the movement path.

20. The operation control apparatus of the movable body according to claim 19, wherein the circuitry is further configured to:

divide the area into the multiple cells having shapes of cubic lattices;

acquire, from the sensor or communicator, a first information related to a wind state in surroundings of the movable body and a second information related to another movable body in the surroundings; and calculate the potential values based on the first information and the second information.

* * * * *